United States Patent
Johnson

(10) Patent No.: US 9,162,364 B2
(45) Date of Patent: Oct. 20, 2015

(54) DEVICE FOR MAKING LACERATIONS IN A SURFACE AND METHOD THEREOF

(76) Inventor: Daniel Lee Johnson, Phelps, NY (US)

( * ) Notice: Subject to any disclaimer, the term of this patent is extended or adjusted under 35 U.S.C. 154(b) by 122 days.

(21) Appl. No.: 13/592,206

(22) Filed: Aug. 22, 2012

(65) Prior Publication Data

US 2013/0213205 A1 Aug. 22, 2013

Related U.S. Application Data

(60) Provisional application No. 61/575,665, filed on Aug. 26, 2011.

(51) Int. Cl.
*B26D 3/00* (2006.01)
*B26D 3/08* (2006.01)
*B60C 11/00* (2006.01)

(52) U.S. Cl.
CPC *B26D 3/00* (2013.01); *B26D 3/003* (2013.01); *B26D 3/08* (2013.01); *B60C 11/00* (2013.01); *Y10T 83/0341* (2015.04); *Y10T 83/0385* (2015.04)

(58) Field of Classification Search
CPC .......... B26D 3/003; B26D 3/005; B26D 3/08; Y10T 83/0341; Y10T 83/0385
USPC .......... 157/13; 407/29.12, 120; 451/340, 548; 83/879, 886, 861, 875, 880; 30/1, 30/164.9, 500; 76/115
See application file for complete search history.

(56) References Cited

U.S. PATENT DOCUMENTS

| | | | |
|---|---|---|---|
| 1,854,312 A * | 4/1932 | Perrenot | ......... 157/13 |
| 2,358,109 A | 9/1944 | Simon | |
| 2,504,090 A | 4/1950 | Sanderson | |
| 2,535,088 A * | 12/1950 | Neilsen | ......... 428/574 |
| 2,570,540 A | 10/1951 | Furnald | |
| 2,623,591 A | 12/1952 | Furnald | |
| 2,696,657 A | 12/1954 | Constantakis | |
| 2,717,640 A | 9/1955 | Schnoebelen | |
| 2,734,568 A | 2/1956 | Anderson | |
| 2,813,329 A | 11/1957 | Tobey | |
| 2,968,344 A * | 1/1961 | Kuts et al. | ......... 157/13 |
| 2,971,247 A | 2/1961 | Cahill | |
| 3,013,449 A | 12/1961 | Tobey | |
| 3,648,752 A * | 3/1972 | Benson | ......... 157/13 |

(Continued)

OTHER PUBLICATIONS

MRW Motorsports Accesories "Tire Grinding or Buffing Carbide Grinding Discs," available at http://www.rockcrawler-mrt.com/tire%20grinder%20carbide%20disk%20or%20nail%20head.htm, 8 pages, retrieved Aug. 22, 2012.

*Primary Examiner* — David B Thomas
(74) *Attorney, Agent, or Firm* — LeClairRyan, a Professional Corporation

(57) ABSTRACT

The present invention relates to a device for making lacerations in a surface of a product without removing the surface. The device includes a power-driven hand tool; a disc member connectable to the power-driven hand tool, wherein when connected to the power-driven hand tool, the disc member can be rotated by the power-driven hand tool in a circular motion; and a plurality of pointed lacerating elements secured to and extending perpendicular from a face of the disc member, where the plurality of lacerating elements form a pattern on the face, and where when the disc member is rotated in a circular motion by the power-driven hand tool, the lacerating elements lacerate the surface of the product without removing the surface. The present invention also relates to a method for lacerating a surface of a product without removing the surface.

20 Claims, 10 Drawing Sheets

(56) References Cited

U.S. PATENT DOCUMENTS

| | | |
|---|---|---|
| 3,721,284 A | 3/1973 | Kent |
| 3,763,914 A | 10/1973 | Vance |
| 4,137,617 A | 2/1979 | Newmayer |
| 4,685,181 A | 8/1987 | Schwartz |
| 7,101,262 B2 | 9/2006 | Hilicus, Sr. |

* cited by examiner

DEVICE FOR MAKING LACERATIONS IN A SURFACE AND METHOD THEREOF

This application claims the benefit of U.S. Provisional Patent Application Ser. No. 61/575,665, filed Aug. 26, 2011, which is hereby incorporated by reference in its entirety.

FIELD OF THE INVENTION

The present invention relates to a device for making lacerations in a surface and method thereof.

BACKGROUND OF THE INVENTION

In dirt track racing, the tires of the cars need to heat up before they achieve maximum traction. One way of facilitating this is to manually grind the tire using a body grinder to produce circular texturized patterns in the tread surfaces of the tires. Manually grinding tires is slow process.

Complex texturing devices have been described that require the tire to be mounted to a complex device.

Other more simple devices use a circular grater or rasp that removes material from the surface of a tire.

Resurfacing wheels have also been described for buffing rubber tires to remove rubber therefrom and to prepare the tire for recapping. These devices use a cutting action produced by the provision of a plurality of cutting means spaced circumferentially about a hub and rotation of the hub in close proximity with a tire so that the cutters contact the tire about the circumference thereof. The cutters are designed and set out in a density and pattern that permits removal of rubber from a tire.

There is a need for a device and method for texturing surfaces, e.g., tire surfaces without removing material from the surface, and without having to mount the tire to a complex device.

The present invention is directed to overcoming these and other deficiencies in the art.

SUMMARY OF THE INVENTION

One aspect of the present invention relates to a device for making lacerations in a surface of a product without removing the surface. The device includes a power-driven hand tool; a disc member connectable to the power-driven hand tool, where when connected to the power-driven hand tool, the disc member can be rotated by the power-driven hand tool in a circular motion; and a plurality of pointed lacerating elements secured to and extending perpendicular from a face of the disc member, where the plurality of lacerating elements form a pattern on the face, and where when the disc member is rotated in a circular motion by the power-driven hand tool, the lacerating elements lacerate the surface of the product without removing the surface.

Another aspect of the present invention relates to a method for lacerating a surface of a product without removing the surface. This method involves providing the device of the present invention; rotating the disc member of the device with the power-driven hand tool; and contacting the surface of the product with the plurality of pointed lacerating elements under conditions effective to lacerate the surface without removing the surface.

A further aspect of the present invention relates to a disc comprising a plurality of tines extending perpendicular from a face of the disc at a height of about 1/16 of an inch to about 1 inch, where the tines are spaced apart at a distance of about 1/8 of an inch to about 1/2 of an inch, and where the disc is capable of being attached to a power-driven hand tool.

DETAILED DESCRIPTION OF THE INVENTION

One aspect of the present invention relates to a device for making lacerations in a surface of a product without removing the surface. The device includes a power-driven hand tool; a disc member connectable to the power-driven hand tool, where when connected to the power-driven hand tool, the disc member can be rotated by the power-driven hand tool in a circular motion; and a plurality of pointed lacerating elements secured to and extending perpendicular from a face of the disc member, where the plurality of lacerating elements form a pattern on the face, and where when the disc member is rotated in a circular motion by the power-driven hand tool, the lacerating elements lacerate the surface of the product without removing the surface.

Figure 1:
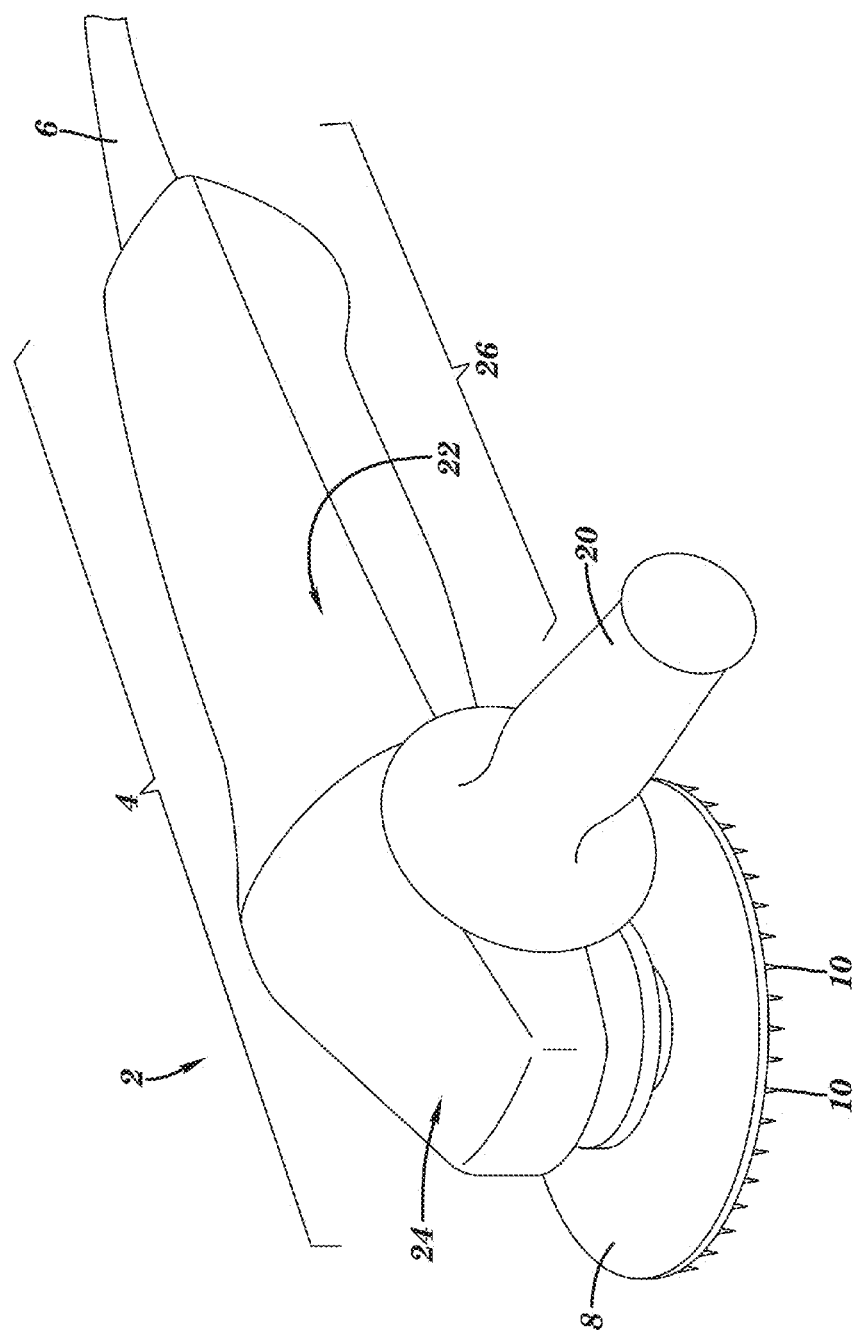
FIG. 1 is a perspective view of one embodiment of a device of the present invention. As illustrated, the device includes a power-driven hand tool and a disc member connected to the power-driven hand tool. The power-driven hand tool rotates the disc member in a circular motion. A plurality of pointed lacerating elements secured to and extending perpendicular from a face of the disc member are shown.

With reference to FIG. 1, one embodiment of the device of the present invention is shown as device 2, which includes power-driven hand tool 4, which has a motor within a housing 22. Housing 22 includes shaft portion 26 and head portion 24. The motor of power-driven hand tool 4 is powered by electrical or pneumatic connector 6. Power-driven hand tool 4 has a handle 20 to give a user support in operating tool 4. Connected to power-driven hand tool 4 is disc member 8. A plurality of pointed lacerating elements 10 are secured to and extend perpendicular from a face of disc member 8.

Power-driven hand tools suitable for the present invention are well known in the art, and may include, without limitation, any variety of power-driven hand tools, such as sanders, grinders, polishers, and the like.

Figure 2:
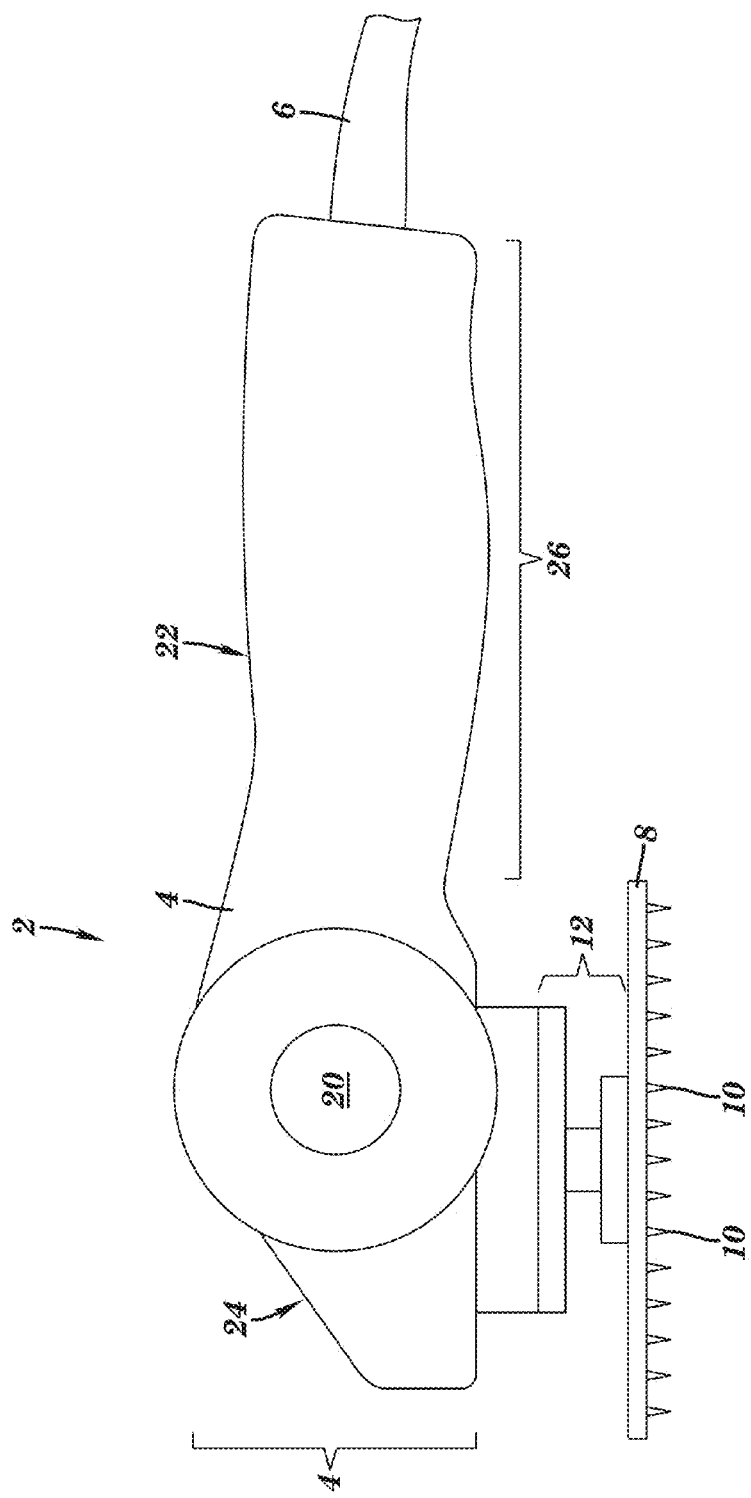
FIG. 2 is a side view of the device illustrated in FIG. 1.

FIG. 2 shows a side view of one embodiment of the device of the present invention. In particular, FIG. 2 shows connection assembly 12, which connects disc member 8 to power-driven hand tool 4. As is standard for commonly used power-driven hand tools, connection assembly 12 permits simple removal and replacement of disc member 8 when needed.

Figure 3:
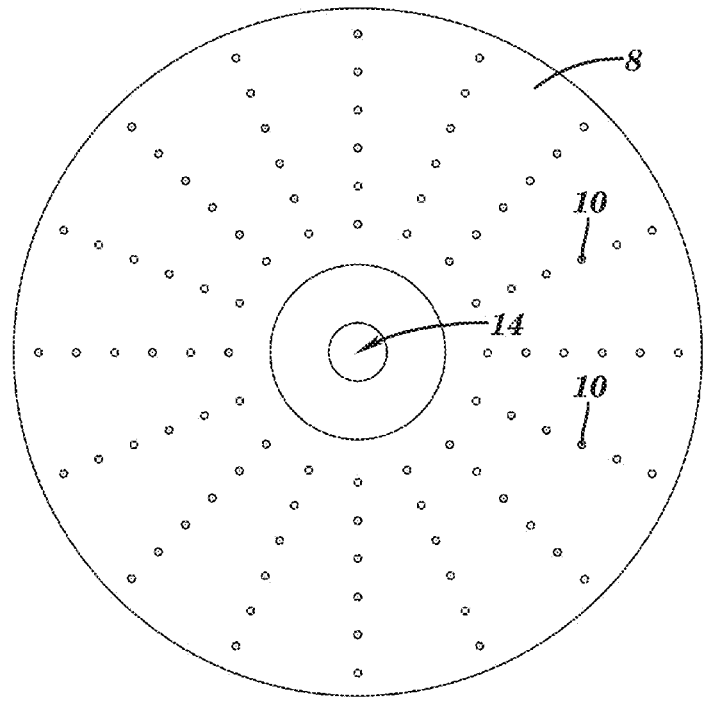
FIG. 3 is a plan view of one embodiment of a surface of a disc member connectable to a power-driven hand tool of the present invention. A plurality of pointed lacerating elements secured to and extending perpendicular from a face of the disc member are shown to be arranged in a pattern.

Referring now to FIG. 3, a plan view of the underside face of disc member 8 is shown. In the particular embodiment shown in FIG. 3, disc member 8 has central hold 14, which mates with connection assembly 12 (see FIG. 2) to connect disc member 8 to power-driven hand tool 4. As shown in FIG. 3, lacerating elements 10, which are secured to and extend perpendicular from a face of disc member 8, are arranged in a pattern on the face of disc member 8. The particular pattern shown in FIG. 3 is just one of many examples of suitable patterns.

In one embodiment, lacerating elements 10 form a pattern on the face of disc member 8 where any two lacerating elements 10 are no closer together than about ⅛ of an inch to about ½ of an inch. In a preferred embodiment, no two lacerating elements 10 are closer together than about ⅜ of an inch. Lacerating elements 10 are spaced apart at an adequate distance to enable laceration of the surface of the product without causing complete abrasion or tearing away of the surface.

Disc member 8 is a disc made from sturdy materials such as metal, plastic, and wood. Disc member 8 typically has a diameter of about 4 inches to about 16 inches, although discs of other diameters may also be used. In a preferred embodiment, the diameter of disc member 8 is about 8 inches. For a disc member having a diameter of about 8 inches, disc member 8 could have as many as 500 lacerating elements, or preferably has from about 200 to 300 lacerating elements, more preferably about 220 to 280 lacerating elements, even more preferably about 230 to about 270 lacerating elements, even more preferably about 240 to about 260 lacerating elements, or about 250 lacerating elements.

In one embodiment, disc member 8 is constructed of a single solid piece of material, e.g., a metal plate. According to this embodiment, lacerating elements 10 are secured to a face of disc member 8 by, e.g., welding the lacerating elements to the disc member. Alternatively, lacerating elements 10 may be formed in one piece with disc member 8, e.g., by injection molding processes.

Figure 8:
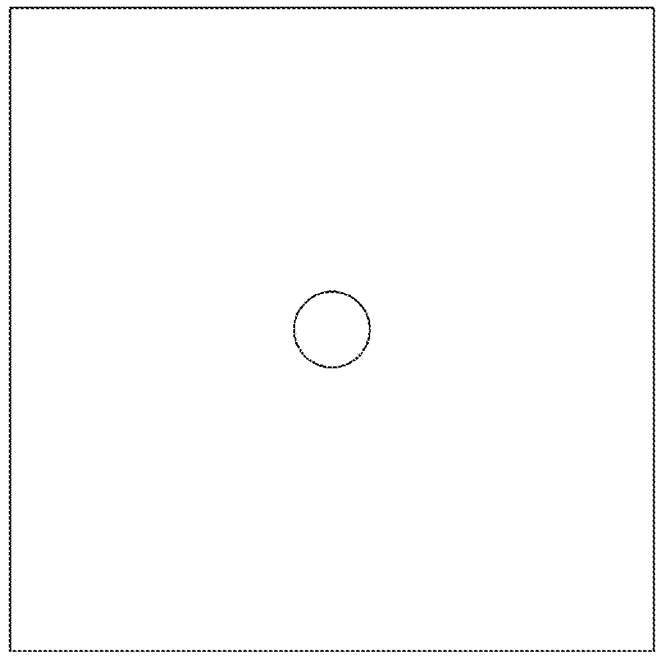
FIG. 8 is a top view of a backing plate that is used to "sandwich" layers of the disc member according to one embodiment of the present invention.
Figure 9:
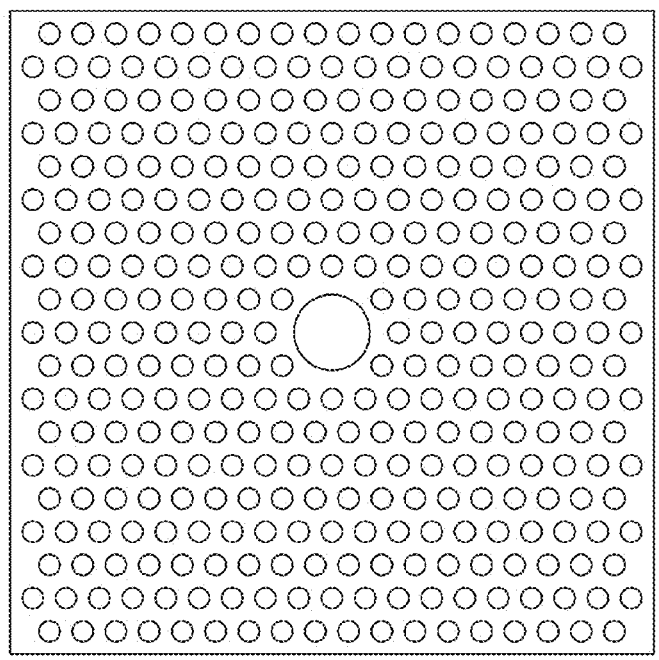
FIG. 9 is a top view of a metal mesh layer, which forms a layer of the disc structure according to one embodiment of the present invention.
Figure 10:
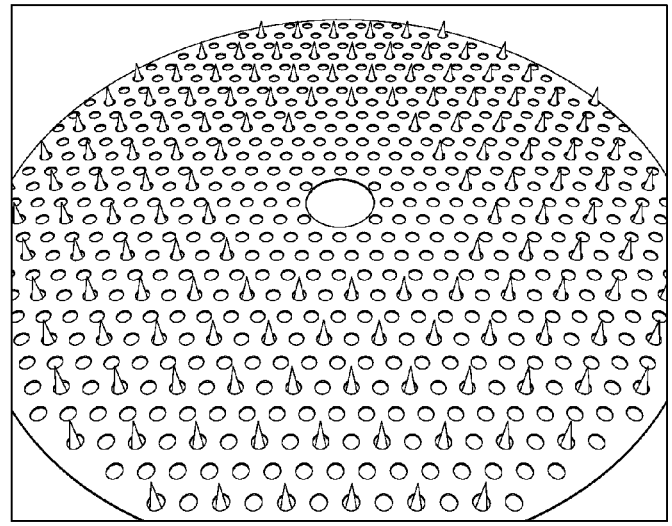
FIG. 10 is a perspective view of one embodiment of the disc member of the device of the present invention. The disc member is formed by sandwiching the heads of a plurality of lacerating elements between a backing plate (FIG. 8) and a metal mesh layer (FIG. 9), with the pointed ends of the lacerating elements protruding through the holes of the metal mesh layer perpendicular from a face of the disc member.
Figure 11:
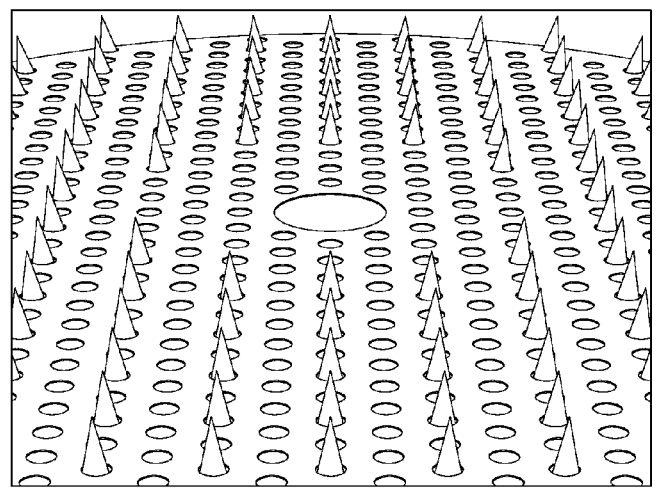
FIG. 11 is a close-up perspective view of the disc member of FIG. 10.
Figure 12:
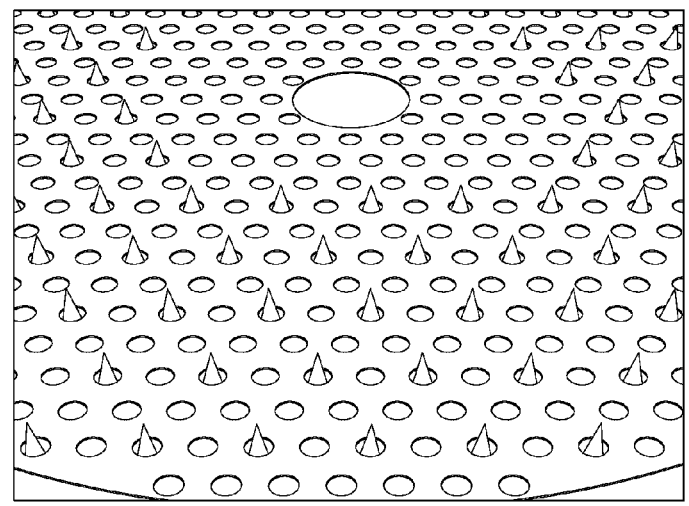
FIG. 12 is a close-up perspective view of the disc member of FIG. 10.

In another embodiment, disc member 8 is formed of at least two parts, including a back plate (FIG. 8) and a mesh e.g., a metal mesh (FIG. 9), placed over the back plate. According to this embodiment, lacerating elements are secured to the back plate by means of the metal mesh, which protrude through the holes of the metal mesh. This embodiment is illustrated in FIGS. 10-12. According to this embodiment, the metal mesh holding the lacerating elements into place may be secured to the back plate by, e.g., spot welding, or any other suitable means.

Figure 4:
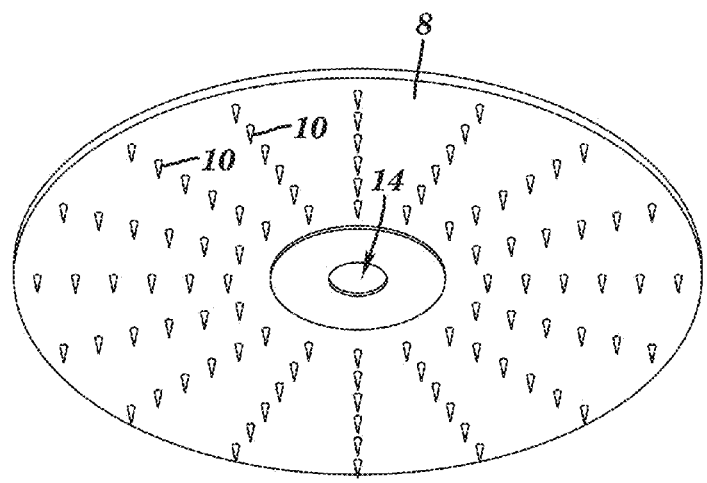
FIG. 4 is a perspective view of the disc member of FIG. 3, illustrating one embodiment of the structure of the lacerating elements secured to and extending perpendicular from a face of the disc member.
Figure 5:
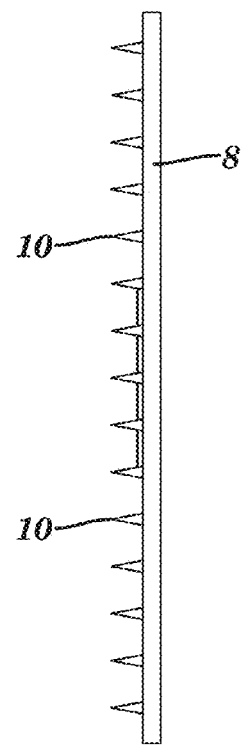
FIG. 5 is a side view of the disc member of FIG. 3, illustrating one embodiment of the structure of the lacerating elements secured to and extending perpendicular from a face of the disc member.

In the perspective view of disc member 8 shown in FIG. 4, and the side view of disc member 8 shown in FIG. 5, lacerating elements 10 are illustrated. Lacerating elements 10 may extend from the face of disc member 8 at a height of ¹⁄₁₆ of an inch to about 1 inch, preferably at a height of about ⅜ of an inch. Lacerating elements 10 typically have a columnar or pyramidal shape with a basal diameter of ¹⁄₁₆, ⅛, ³⁄₁₆, ¼, ⁵⁄₁₆, or ⅜ of an inch, preferably about ⅛ of an inch. In one embodiment, lacerating elements 10 form a sharp point at their tip away from the disc member face to which they are attached at their base. However, it is not necessary that lacerating elements 10 form a sharp point at their tip. Lacerating elements 10 may be constructed of any material strong enough to withstand rigorous contact with a surface to be lacerated. One suitable material includes, without limitation, metal. In one embodiment, lacerating elements 10 are No. 3 tacks known to persons of ordinary skill in the art.

Figure 6:
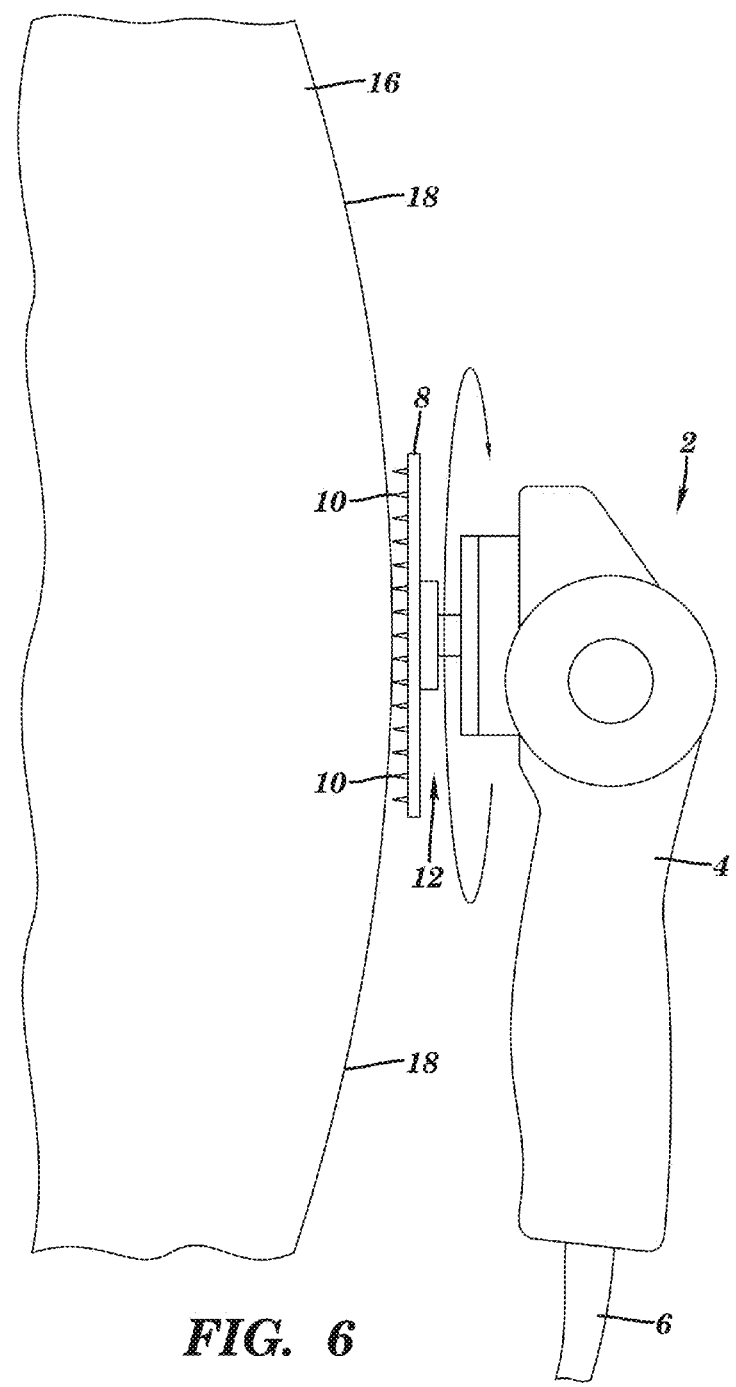
FIG. 6 is a schematic illustration of one embodiment of the device of the present invention being brought into contact with the surface of a product to make lacerations in the surface of the product without abrading or removing material from the surface.
Figure 7:
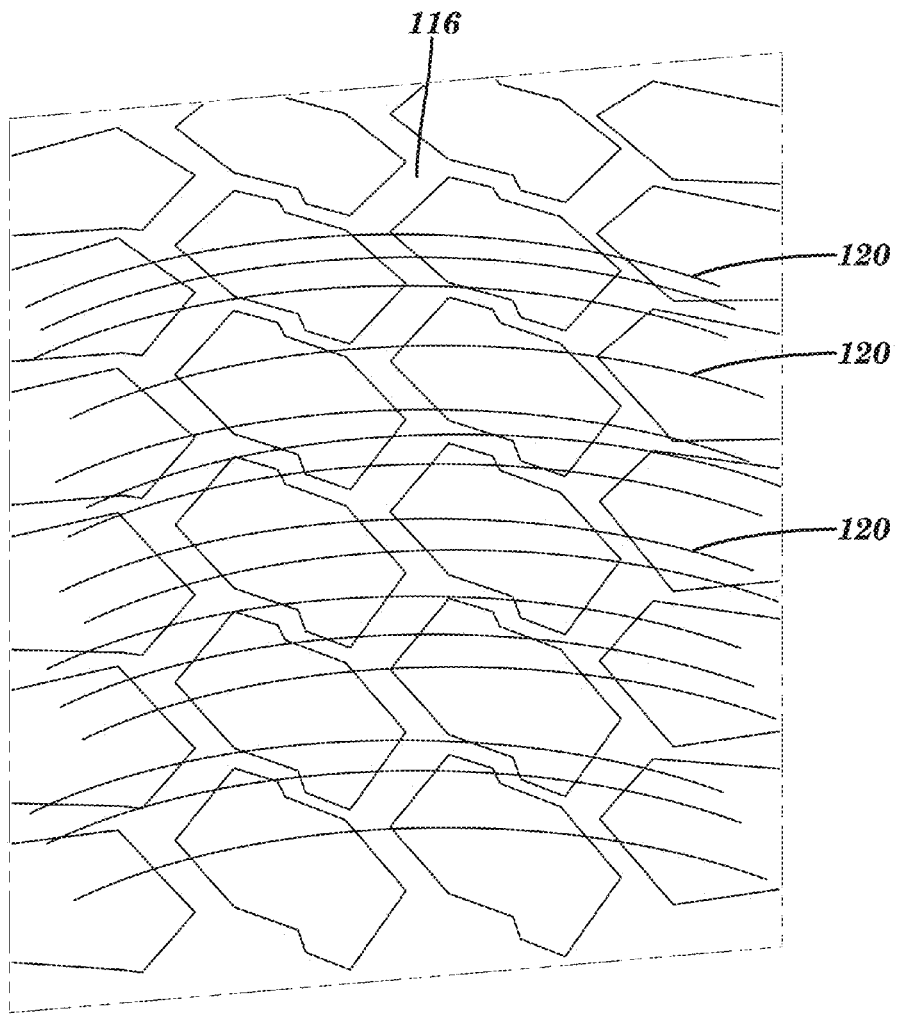
FIG. 7 is a schematic illustration of a tire surface having been lacerated by the lacerating elements of a device of the present invention.

FIG. 6 shows one embodiment of device 2 of the present invention in operation. As illustrated, device 2 is brought into contact with surface 18 of object 16 (e.g., a tire). Disc member 8 connected to power-drive hand tool 4 is rotated in a single direction as shown as it contacts surface 18, and lacerating elements 10 lacerate surface 18 to form lacerations or grooves in surface 18.

Thus, another aspect of the present invention relates to a method for lacerating a surface of a product without removing the surface. This method involves providing the device of the present invention; rotating the disc member of the device with the power-driven hand tool; and contacting the surface of the product with the plurality of pointed lacerating elements under conditions effective to lacerate the surface without removing the surface.

In carrying out the method of the present invention, the disc member is preferably rotated at a speed of about 2500 rounds per minute ("rpm"), or about 2000 to 3000 rpm, or about 1500 to 3500 rpm, or about 1000 to 4000 rpm.

According to one embodiment, by "lacerate" it is meant slices, grooves, and/or roughage, without actually removing material, or removing only minimal amounts of material, but in any event not removing enough material to lower the height of the surface of the object or to remove the surface of the object. According to this embodiment, the object and/or its surface are constructed of a material capable of having "give," e.g., a rubber tire. Thus, lacerating a rubber tire involves placing cuts in the rubber without removing a substantial amount of material. For example, lacerating the surface of a tire in accordance with this embodiment of the present invention does not remove a layer of the surface. Instead, the lacerating elements gouge, slice, and/or cut into the surface (e.g., tire tread) to a distance of about ¹⁄₁₆ of an inch to about ¼ of an inch or a half of an inch or more. In a preferred embodiment, lacerating elements penetrate the surface at a depth of about ³⁄₁₆ of an inch, as illustrated in FIGS. 6, 7, 13, and 14. The resulting lacerations in the surface result in a high density of closely spaced pattern of slices and/or grooves across the surface. The slices and/or grooves are formed in the surface while the top of the surface is maintained. In other words, the texturizing does not reduce the thickness of the surface (e.g., tire tread) or remove any substantial portion of the surface.

Surfaces of objects to be lacerated pursuant to the method of the present invention include, without limitation, objects formed of rubber, foam, plastic, cloth, leather, and cardboard.

In one embodiment, the material lacerated by the device of the present invention is a rubber tire, e.g., a racing tire. Lacerating the surface of the tire with the device of the present invention imparts to the tire better traction and more even heat distribution along the surface of the tire for optimum operating temperatures. The lacerations created by the device of the present invention also impart greater stability and longevity to the tire and tire surface over a tire having an original manufactured surface.

Other products amenable to being lacerated with the device of the present invention include, without limitation, aviation tires; slippery flooring to impart better traction on the surface thereof, such as flooring in hospitals and factories; work boots; winter boots, running and/or athletic shoes, sneakers, motorcycle tires, tractor tires, and wheel chair tires.

A further aspect of the present invention relates to a disc comprising a plurality of tines extending perpendicular from a face of the disc at a height of about 1/16 of an inch to about 1 inch, where the tines are spaced apart at a distance of about 1/18 of an inch to about 1/2 of an inch, and where the disc is capable of being attached to a power-driven hand tool.

EXAMPLES

The following examples are provided to illustrate embodiments of the present invention but are by no means intended to limit its scope.

Example 1

Rubber Tire Lacerating Device for Improved Traction on Dirt

A device for lacerating the rubber tread of race care tires for better traction on a dirt track was made by forming a 16 gauge metal backing plate having a diameter of about 8 inches. A 16 gauge 3/16-inch centered metal mesh material having about the same diameter as the backing plate was formed. No. 3 tacks were set in every other hole in the metal mesh to form a pattern in the metal mesh and the backing plate was secured to the mesh to hold the No. 3 tacks in place by spot welding.

The disc was then mounted on a hand grinder.

Figure 13:
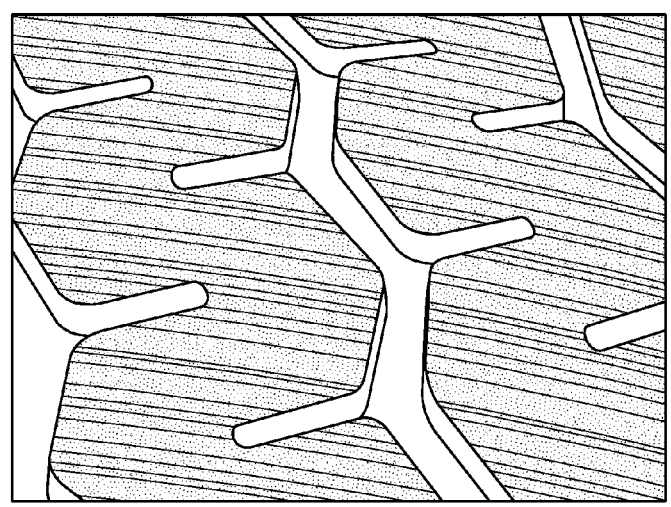
FIG. 13 shows a surface of a tire that has been lacerated by the device of the present invention.
Figure 14:
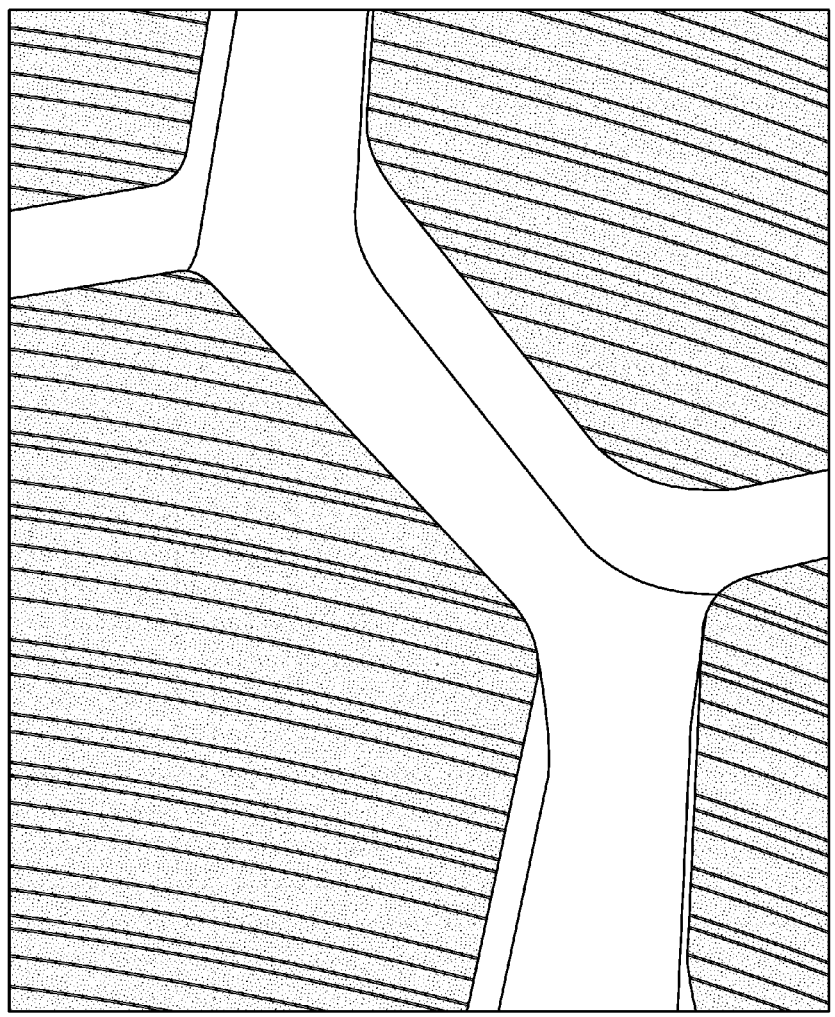
FIG. 14 is a close-up view of the tire surface shown in FIG. 13.

Race car tires were lacerated using the device. Line drawings of the tires are shown in FIGS. 13 and 14.

What is claimed:

1. A device for making lacerations in a surface of a product without removing the surface, comprising:
a power-driven hand tool;
a disc member connectable to the power-driven hand tool, wherein when connected to the power-driven hand tool, the disc member can be rotated by the power-driven hand tool in a circular motion;
a plurality of pointed lacerating elements secured to and extending perpendicular from a face of the disc member, wherein the plurality of lacerating elements form a pattern on the face, and wherein when the disc member is rotated in a circular motion by the power-driven hand tool, the lacerating elements lacerate the surface of the product without removing the surface.

2. The device of claim 1, wherein the disc member is constructed of metal.

3. The device of claim 1, wherein the face of the disc member has a diameter of between about 4 inches and 16 inches.

4. The device of claim 1, wherein said disc member has a diameter of about 8 inches and said disc member comprises about 250 lacerating elements.

5. The device of claim 1, wherein said plurality of pointed lacerating elements extend from the face at a height of about 1/16 of an inch to about 1 inch.

6. The device of claim 1, wherein said plurality of pointed lacerating elements have a columnar shape with a diameter of about 1/8 of an inch.

7. The device of claim 1, wherein said plurality of pointed lacerating elements are constructed of metal.

8. The device of claim 1, wherein said plurality of pointed lacerating elements form a pattern where any two elements are no closer together than about 3/8 of an inch.

9. The device of claim 1, wherein the product is a rubber tire.

10. A method for lacerating a surface of a product without removing the surface, said method comprising:
providing the device of claim 1;
rotating the disc member of the device with the power-driven hand tool;
contacting the surface of the product with the plurality of pointed lacerating elements under conditions effective to lacerate the surface without removing the surface.

11. The method of claim 10, wherein the disc member is constructed of metal.

12. The method of claim 10, wherein the face of the disc member has a diameter of between about 4 inches and 16 inches.

13. The method of claim 10, wherein said disc member has a diameter of about 8 inches and said disc member comprises about 250 lacerating elements.

14. The method of claim 10, wherein said plurality of pointed lacerating elements extend from the face at a height of about 1/16 of an inch to about 1 inch.

15. The method of claim 10, wherein said plurality of pointed lacerating elements have a columnar shape with a diameter of about 1/8 of an inch.

16. The method of claim 10, wherein said plurality of pointed lacerating elements are constructed of metal.

17. The method of claim 10, wherein said plurality of pointed lacerating elements form a pattern where any two elements are no closer together than about 3/8 of an inch.

18. The method of claim 10, wherein the product is a rubber tire.

19. A disc comprising a plurality of tines extending perpendicular from a face of the disc at a height of about 1/16 of an inch to about 1 inch, wherein the tines are spaced apart at an adequate distance to enable laceration of the surface of a product without causing complete abrasion or tearing away from the surface and wherein the disc is capable of being attached to a power-driven hand tool.

20. The disc according to claim 19, wherein the tines are spaced apart at a distance of about 1/8 to about 1/2 an inch.

* * * * *